United States Patent
Johnson et al.

(10) Patent No.: US 7,466,217 B1
(45) Date of Patent: Dec. 16, 2008

(54) SYSTEM FOR DETERMINING ABANDONMENT OF CHILD IN UNATTENDED VEHICLE

(75) Inventors: Alexander C. Johnson, Portland, OR (US); Scott W. Nelson, Beaverton, OR (US); Hal A. Porter, Portland, OR (US); Joshua R. Paulson, Ridgefield, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,654

(22) Filed: Apr. 24, 2008

(51) Int. Cl.
| | |
|---|---|
| B60Q 1/00 | (2006.01) |
| G08B 1/08 | (2006.01) |
| G08B 23/00 | (2006.01) |
| G08B 21/00 | (2006.01) |
| B60R 21/16 | (2006.01) |
| B60R 22/00 | (2006.01) |
| B60R 22/48 | (2006.01) |
| B60R 21/00 | (2006.01) |
| B60K 28/00 | (2006.01) |
| H04M 11/00 | (2006.01) |
| H04M 11/04 | (2006.01) |

(52) U.S. Cl. .................... 340/425.5; 340/438; 340/439; 340/457; 340/457.1; 340/459; 340/539.1; 340/539.22; 340/539.26; 340/573.1; 340/573.4; 340/665; 340/666; 340/667; 340/686.1; 340/686.6; 280/735; 280/801.1; 280/801.2; 180/268; 180/270; 180/271; 180/272; 180/274; 180/286; 180/287; 455/403; 455/404.1; 455/404.2

(58) Field of Classification Search ............. 340/425.5, 340/438, 439, 457, 457.1, 459, 539.1, 539.22, 340/573.1, 665–667, 686.1, 686.4, 687; 180/268, 180/270, 271, 272, 273, 274, 286, 287; 280/735, 280/801.1, 801.2; 455/403, 405.1
See application file for complete search history.

(56) References Cited

U.S. PATENT DOCUMENTS

| | | | | |
|---|---|---|---|---|
| 5,260,684 | A * | 11/1993 | Metzmaker | 340/457.1 |
| 6,489,889 | B1 | 12/2002 | Smith | |
| 6,535,137 | B1 * | 3/2003 | Ryan | 340/687 |
| 6,812,844 | B1 * | 11/2004 | Burgess | 340/573.1 |
| 6,924,742 | B2 * | 8/2005 | Mesina | 340/573.1 |
| 6,930,614 | B2 | 8/2005 | Rackham et al. | |
| 6,998,988 | B1 * | 2/2006 | Kalce | 340/573.1 |
| 7,012,533 | B2 * | 3/2006 | Younse | 340/573.1 |
| 7,170,401 | B1 * | 1/2007 | Cole | 340/457 |

(Continued)

Primary Examiner—Daniel Wu
Assistant Examiner—Lam P Pham
(74) Attorney, Agent, or Firm—Cantor Colburn LLP; Abdy Raissinia

(57) ABSTRACT

A system for signaling that a person is in an vehicle is provided and includes a power source, a processing unit including a counter, a state monitoring unit configured to monitor an internal temperature of the vehicle and to monitor whether the vehicle is in an off state and a door monitoring unit configured to monitor whether any of the vehicle doors are open or closed, a first buckle receiver, including a first signal issuing unit, a first buckle to be removably inserted into the buckle receiver and to thereby cause the first signal issuing unit to issue an installation signal to the processing unit, a second buckle receiver, including a second signal issuing unit, a second buckle to be removably inserted into the second buckle receiver and to thereby cause the second signal issuing unit to issue an occupation signal to the processing unit, and an alarm unit.

1 Claim, 2 Drawing Sheets

U.S. PATENT DOCUMENTS

Figure 1:
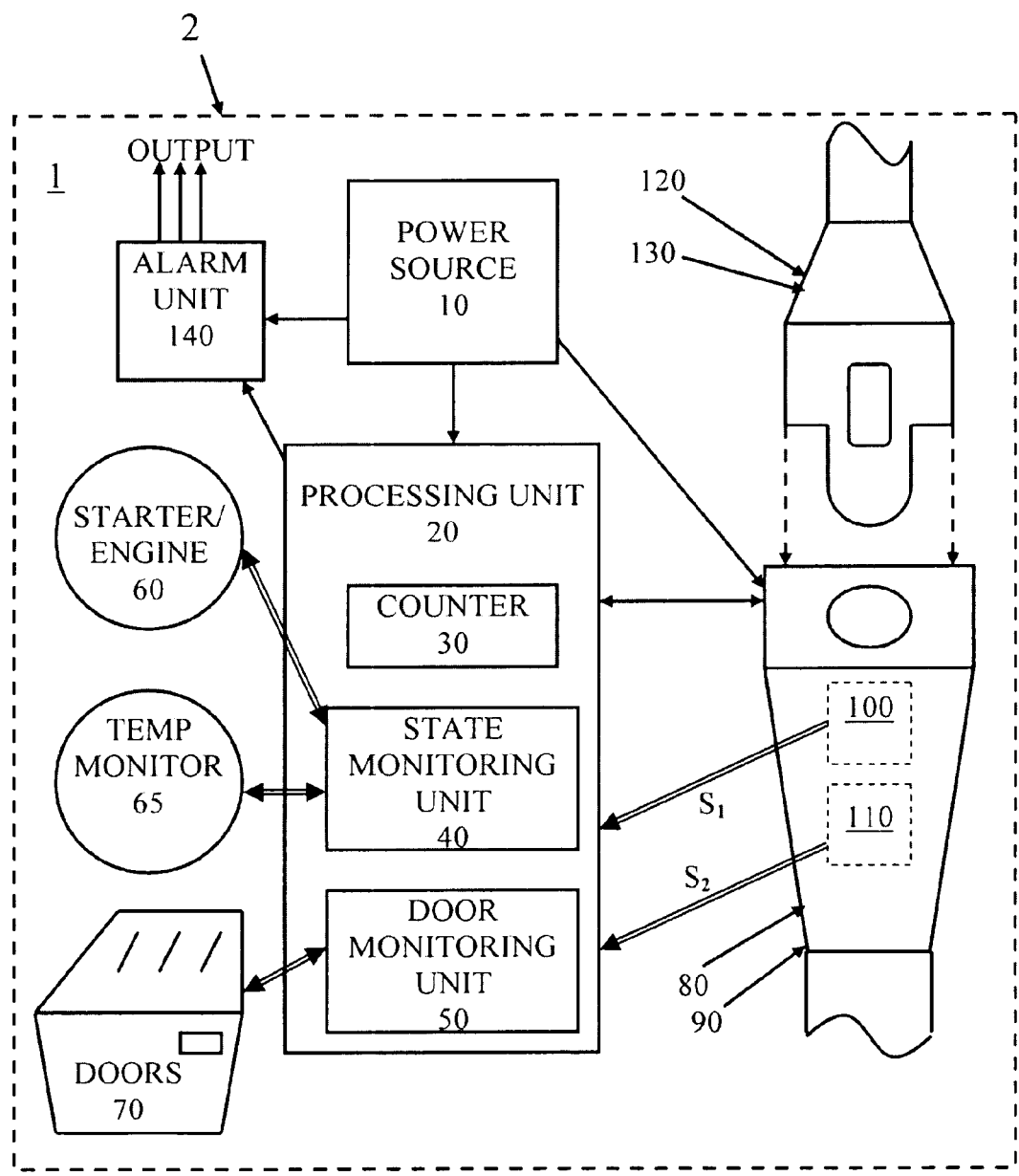

| | | | |
|---|---|---|---|
| 7,218,218 B1 * | 5/2007 | Rogers | 340/522 |
| 7,233,239 B2 * | 6/2007 | Chitalia et al. | 340/457.1 |
| 7,265,671 B1 | 9/2007 | Valles et al. | |
| 7,378,979 B2 * | 5/2008 | Rams, Jr. | 340/667 |
| 2003/0122662 A1 * | 7/2003 | Quinonez | 340/457 |

* cited by examiner

US 7,466,217 B1

SYSTEM FOR DETERMINING ABANDONMENT OF CHILD IN UNATTENDED VEHICLE

BACKGROUND OF THE INVENTION

1. Field of the Invention

Aspects of the present invention are directed to a signaling system of a vehicle and, more particularly, to a system for signaling that a child is left in a vehicle.

2. Description of the Background

In modern vehicles, many systems are in place to alert an operator thereof of malfunctions and dangers. There are oil and engine temperature alerts that appear on dashboards, alerts that a passenger is not wearing a seatbelt while the vehicle is turned on, and alarms that alert the operator when the headlights are left on while the vehicle is turned off and a door is opened. Nothing exists, however, to indicate that a child is left in the vehicle when the vehicle is turned off.

Concurrently, every summer and winter brings news stories of children dying or being hospitalized due to exposure to extreme heat or cold in vehicles. Invariably, these cases result from a parent or guardian leaving the child in the vehicle without some form of temperature control employed. Especially during the summer, this results in the interior of the vehicle heating up and the unfortunate child being unable to extricate him/herself from the danger. Certainly, the parent or guardian would not have meant to harm the child, but it is likely that all would have benefited from some form of alert advising them of the dangerous situation.

SUMMARY OF THE INVENTION

In accordance with an aspect of the invention, a system for signaling that a person is left in a vehicle is provided and includes a power source, a processing unit coupled to the power source, the processing unit including a counter and a state monitoring unit configured to monitor an internal temperature of the vehicle and to monitor whether the vehicle is in an on or an off state and a door monitoring unit configured to monitor whether any of the vehicle doors are open or closed, a first buckle receiver, including a first signal issuing unit, coupled to the power source and the processing unit, a first buckle to be removably inserted into the first buckle receiver and to thereby cause the first signal issuing unit to issue an installation signal to the processing unit, a second buckle receiver, including a second signal issuing unit, coupled to the power source and either the processing unit directly or the processing unit via the first buckle receiver, a second buckle to be removably inserted into the second buckle receiver and to thereby cause the second signal issuing unit to issue an occupation signal to the processing unit, and an alarm unit coupled to the power source and the processing unit to issue an alarm when the installation signal and the occupation signal are each currently received by the processing unit, when the processing unit determines that the internal temperature of the vehicle is elevated and that the vehicle is turned from the on to the off state, and when the counter determines that a predetermined time has passed with the vehicle doors being closed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

Figure 2:
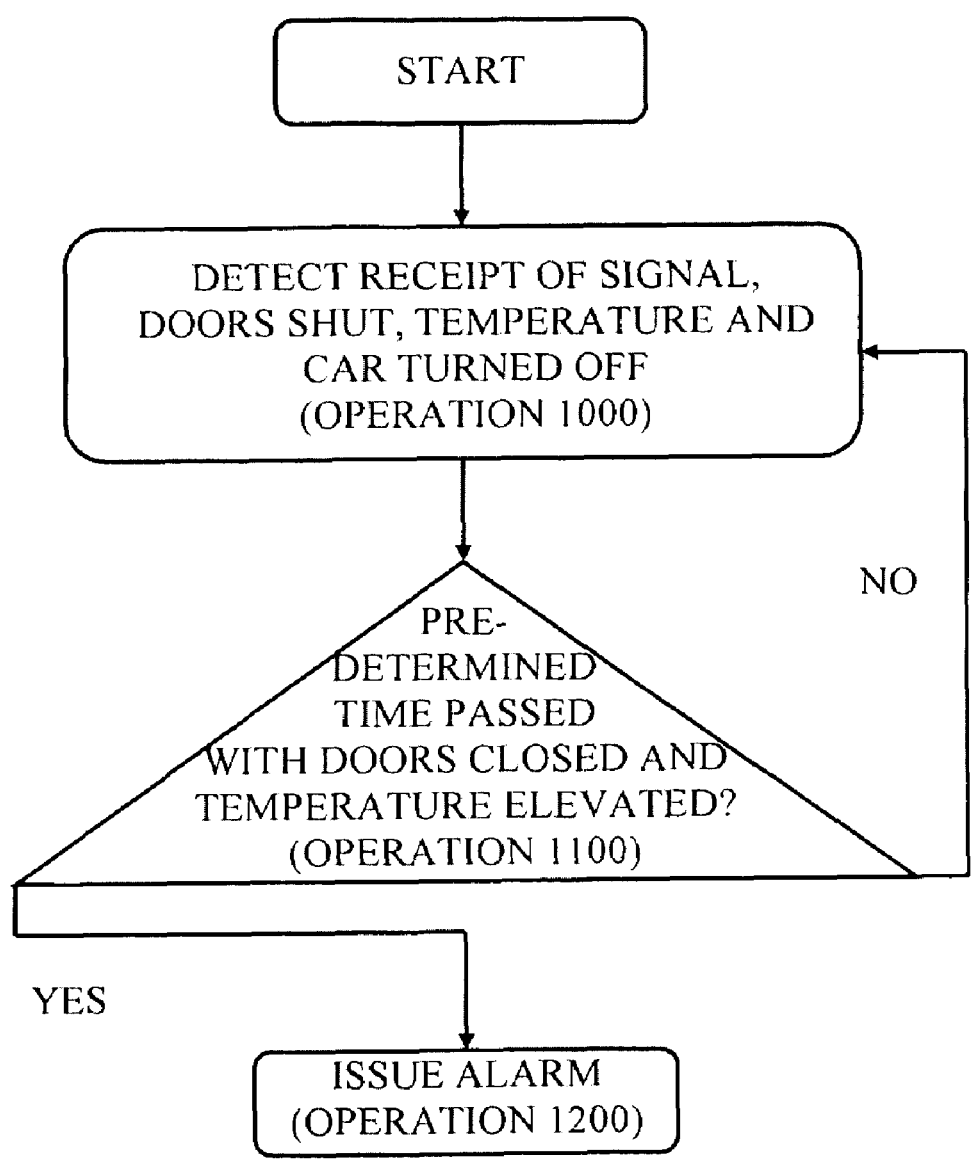

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic view of a system for signaling that a person is left in a vehicle in accordance with an embodiment of the invention; and FIG. 2 is a now diagram illustrating a method of operating the system of FIG. 1 in accordance with an embodiment of the invention.

DETAILED DESCRIPTION OF THE INVENTION

With reference to FIG. 1, a system 1 is provided for signaling that a child, or a person requiring assistance, is left in a vehicle 2. The system 1 may be leveraged onto existing systems or may stand alone. In any case, the system 1 includes a power source 10 and a processing unit 20. The power source 10 may be a car battery, another power source that is independent of the car battery, or a combination of the car battery and an independent power source.

The processing unit 20 is coupled to the power source 10 via wired and/or wireless connections and may include a micro-processor, or any other similar device, of a computing apparatus that is disposed in or on the vehicle 2. The processing unit 20 includes a counter 30, a state monitoring unit 40 and a door monitoring unit 50.

The counter 30 may be a timer or any other suitable device for tracking time from an initial point to a secondary point sometime thereafter. The state monitoring unit 40 is configured to monitor whether the vehicle 2 is in an on or an off state and to monitor an internal temperature of the vehicle 2. In this capacity, the state monitoring unit 40 is coupled to the starter and/or the engine 60 and a temperature monitor 65 of the vehicle 2 via wired and/or wireless connections. In embodiments of the invention, the state monitoring unit 40 may be further configured to monitor whether the vehicle 2 is idling in the on state and to monitor ambient temperatures within the passenger compartment of the vehicle 2. In still further embodiments of the invention, the state monitoring unit 40 may also be configured with a pressure monitor to monitor pressure applied to a passenger seat by a child in the automobile 2, a sound detector to detect sounds expressed by the child and/or a motion detector to detect any motion of the child. The door monitoring unit 50 is coupled to each of the doors 70 of the vehicle 2 via wired and/or wireless connections and is configured to monitor whether any of the doors 70 are open or closed according to methods well known in the art.

The system 1 further includes a first buckle receiver 80 that is configured to receive a first buckle 120 in a releasable mating arrangement. The first buckle receiver 80 is coupled to the power source 10 and the processing unit 20 and includes a first signal issuing unit 100 that is configured to issue an installation signal $S_1$ to the processing unit 20 when the first buckle 120 is received in the first buckle receiver 80. Since the first buckle receiver 80 is coupled to the power source 10, the installation signal $S_1$ may be issued by the first buckle receiver 80 upon receipt of the first buckle 120 regardless of whether the vehicle is in the on or the off state. The respective coupling of the first buckle receiver 80 to the power source 10 and the processing unit 20 may be via wired and/or wireless connections, such as a radio frequency (RF) transmitter and receiver combination.

In an embodiment of the invention, it is understood that the first buckle receiver 80 and the first buckle 120 may be leveraged as part of the seatbelt system of the vehicle 2. In this case, the seatbelt has the first buckle 120 attached thereto and is threaded through a car seat being installed in the vehicle 2 until the first buckle 120 is received in the first buckle receiver 80 so as to secure the car seat to the vehicle 2. At this point, the first buckle receiver 80 issues the installation signal $S_1$ to the processing unit 20 and the processing unit 20 recognizes that a car seat is installed.

In another embodiment of the invention, the seatbelt system is not employed to install the car seat in the vehicle 2. Rather, the car seat or a base of an infant carrier/base combination is substantially rigidly hooked onto hooks within the seat cushions. In this case, the car seat or the base is modified to have the first buckle 120 disposed thereon as an addition. Here, the first buckle 120 is still received in the first buckle receiver 80 but is not otherwise employed to secure the car seat. Once the first buckle 120 is received in the first buckle receiver 80, the first buckle receiver 80 issues the installation signal $S_1$ to the processing unit 20 such that the processing unit 20 recognizes that a car seat or the base of the infant carrier/base combination is installed.

A second buckle receiver 90 is provided on the car seat or the infant carrier, which is removably mounted in the base, and is configured to receive a second buckle 130, which is also provided on the car seat or the infant carrier. The second buckle receiver 90 includes a second signal issuing unit 110 that issues an occupation signal $S_2$ to the processing unit 20 when the second buckle receiver 90 receives the second buckle 130 and when the car seat or the infant carrier is at least in the proximity of the vehicle 2. The occupation signal S2 indicates to the processing unit 20 that a child occupies the car seat or the infant carrier. The second buckle receiver 90 is coupled to the power source 10 and either the processing unit 20 directly or to the processing unit 20 via the first buckle receiver 80 in a similar manner as described above.

With this arrangement, when the processing unit 20 currently receives the installation signal $S_1$ and the occupation signal $S_2$, the processing unit 20 recognizes a potential danger in that a car seat or an infant carrier/base combination is installed in the vehicle 2 and that a child occupies the same. Conversely, when the processing unit 20 receives the installation signal S1 but does not receive the occupation signal S2, the processing unit 20 does not recognize a potential danger in that, while the car seat or the base is installed in the vehicle 2, it is otherwise unoccupied. Thus, an operator of the vehicle 2 need not remove the car seat or the base from the vehicle 2 every time the operator removes the child at risk of the processing unit 20 recognizing a potential danger.

An alarm unit 140 is coupled to the power source 10 and the processing unit 20 to issue an alarm (e.g., the output of FIG. 1) when the processing unit 20 recognizes the potential danger of a car seat or an infant carrier/base combination being installed in the vehicle 2 and that a child occupies the same and when other pre-conditions are met. That is, the processing unit 20 causes the alarm unit 140 to issue the alarm when the installation signal $S_1$ and the occupation signal $S_2$ are each currently received by the processing unit 20, when the processing unit 20 determines that an interior temperature of the vehicle 2 is elevated and that the vehicle 2 is turned from the on to the off state based on readings of the state monitoring unit 40, and when the counter 30 determines that a predetermined time has passed with the doors 70 being closed based on a reading of the door monitoring unit 50.

In embodiments of the invention and, in particular embodiments in which the state monitoring unit 40 is configured to monitor the ambient temperature of the interior of the vehicle 2, child sounds or motion within the interior, the pre-conditions listed above need not always be met for the alarm unit 140 to activate. That is, if the exterior temperature outside of the vehicle 2 is elevated, the potential danger in the interior of the vehicle 2 may not be mitigated even where the doors 70 are open. In this case, if the ambient temperature of the interior of the vehicle 2 is highly elevated, the alarm unit 140 may be activated as long as the processing unit 20 detects that a child is in the vehicle 2. This situation could occur when the installation signal $S_1$ and the occupation signal $S_2$ are not currently received by the processing unit 20. Thus, if a child is locked in the trunk of the vehicle 2 and the state monitoring unit 40 detects sounds therefrom, the alarm unit 140 would still activate.

The predetermined time is established and is based on competing desires to have a child removed from the potential danger in the vehicle 2 with time to spare and to allot the operator a sufficient and fair opportunity to do so without having the alarm go off. Here, where the state monitoring unit 40 is configured to monitor the ambient temperature of the interior of the vehicle 2, the predetermined time may be adjusted based on a measurement of a highly elevated ambient temperature. That is, if the processing unit is programmed to regard as immediately dangerous a measurement of 100° F. for the ambient temperature of the interior of the vehicle 2, the predetermined time will be set at mere seconds from the time the vehicle 2 is turned off with the doors 70 shut.

The alarm of the alarm unit 140 could be an audible car alarm, an automatic alert that is sent to emergency officials or other first responders, or a text message sent to the cell phone of the operator. In this case, the alarm system 140 may be coupled, via Bluetooth or some other suitable connection, to the operator's cell phone.

In still further embodiments of the invention, the processing unit 20 or the alarm unit 140 may be coupled to the temperature control system of the vehicle 2. In these cases, the temperature control system of the vehicle 2 is automatically activated, even if the vehicle 2 is turned off, to decrease the ambient temperature of the interior of the vehicle 2 and to thereby limit any harm resulting from the potential danger.

With reference to FIG. 2, a method of signaling that a child is left in the vehicle 2 is shown and includes detecting that the installation signal $S_1$ and the occupation signal $S_2$ are each currently received by the processing unit 20, that the doors 70 are closed, that an internal temperature of the vehicle 2 is elevated and that the vehicle 2 is turned off (operation 1000), determining that a predetermined period of time has passed (operation 1100), and issuing the alarm when the predetermined period of time is determined to have passed (operation 1200).

According to aspects of the invention, the methods described above may be embodied as computer or machine readable media that have instructions stored thereon to execute the methods.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A system for signaling that a person is left in a vehicle, the system comprising:
   a power source;
   a processing unit coupled to the power source, the processing unit including a counter and a state monitoring unit configured to monitor an internal temperature of the vehicle and to monitor whether the vehicle is in an on or an off state and a door monitoring unit configured to monitor whether any of the vehicle doors are open or closed;
   a first vehicle seat buckle receiver, including a first signal issuing unit, coupled to the power source and the processing unit;
   a first vehicle seat buckle to be removably inserted into the first buckle receiver to install a child seat on a vehicle seat and to thereby cause the first signal issuing unit to issue an installation signal to the processing unit;
   a second child seat buckle receiver, including a second signal issuing unit, coupled to the power source and either the processing unit directly or the processing unit via the first buckle receiver;
   a second child seat buckle to be removably inserted into the second buckle receiver indicative of occupation of the person on the child seat and to thereby cause the second signal issuing unit to issue an occupation signal to the processing unit; and
   an alarm unit coupled to the power source and the processing unit to issue an alarm when the installation signal and the occupation signal are each currently received by the processing unit, the processing unit determines that the internal temperature of the vehicle is elevated and that the vehicle is turned from the on to the off state, and the counter determines that a predetermined time has passed with the vehicle doors being closed.

* * * * *

UNITED STATES PATENT AND TRADEMARK OFFICE
CERTIFICATE OF CORRECTION

PATENT NO. : 7,466,217 B1  Page 1 of 1
APPLICATION NO. : 12/108654
DATED : December 16, 2008
INVENTOR(S) : Alexander C. Johnson et al.

It is certified that error appears in the above-identified patent and that said Letters Patent is hereby corrected as shown below:

Title page Item [75] please correct the spelling of inventor Joshua R. Paulson to read as follows:

Joshua R. Poulson

Signed and Sealed this

Seventeenth Day of February, 2009

JOHN DOLL
*Acting Director of the United States Patent and Trademark Office*